United States Patent [19]

Simson

[11] Patent Number: 5,113,292
[45] Date of Patent: May 12, 1992

[54] PANORAMIC REARVIEW MIRROR WITH AN ELONGATED ADJUSTABLE SUPPORT

[76] Inventor: Anton K. Simson, 13227 Aubrey St., Poway, Calif. 92064

[21] Appl. No.: 639,290

[22] Filed: Jan. 10, 1991

Related U.S. Application Data

[63] Continuation-in-part of Ser. No. 553,983, Jul. 17, 1990, Pat. No. 5,054,900, which is a continuation of Ser. No. 380,374, Jul. 17, 1989, abandoned.

[51] Int. Cl.$^5$ .............. G02B 5/08; G02B 7/18; G02F 1/13; B60R 1/04
[52] U.S. Cl. .................... 359/851; 359/872; 359/604
[58] Field of Search ............ 359/851, 866, 855, 850, 359/872, 604, 603

[56] References Cited

U.S. PATENT DOCUMENTS

| | | | |
|---|---|---|---|
| 2,573,812 | 11/1951 | Schroeder | 350/613 |
| 2,953,062 | 9/1960 | Ford | 350/613 |
| 3,806,232 | 4/1974 | Gray | 350/613 |
| 3,806,233 | 4/1974 | Stefano | 350/613 |
| 3,861,785 | 1/1975 | Barbour | 350/613 |
| 4,630,905 | 12/1986 | Blom | 350/613 |

*Primary Examiner*—Jon W. Henry
*Attorney, Agent, or Firm*—Henri J. A. Charmasson

[57] ABSTRACT

A grated thin-film surface forms a plurality of successive narrow silvered panels which are oriented to provide a composite and linear mirror. The thin film is mounted against a support whose inward face is a congruent replica of the inside upper section of a vehicle windshield, or sandwiched between the plies of such a support. The reflective surface is covered with a layer of liquid crystal of which the opacity can be electrically adjusted. The plane of each silvered panel is defined by a first transversal angle in reference to the horizon, and by a longitudinal angle in reference with the slant of the underlying inward face section of the support and windshield.

8 Claims, 2 Drawing Sheets

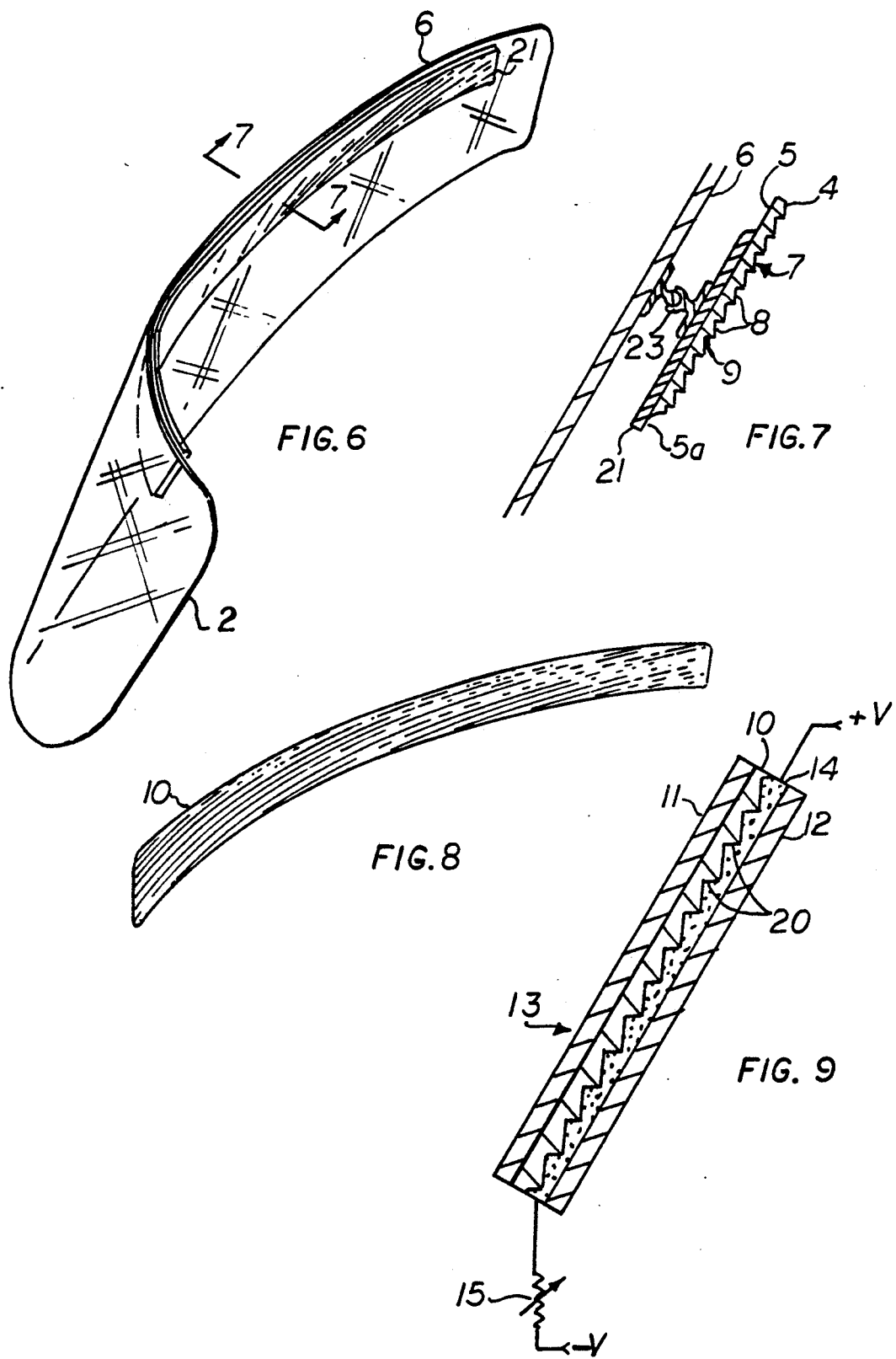

PANORAMIC REARVIEW MIRROR WITH AN ELONGATED ADJUSTABLE SUPPORT

PRIOR APPLICATIONS

This is a continuation-in-part of Ser. No. 07/553,983 filed Jul. 17, 1990, now U.S. Pat. No. 5,054,900, which is a continuation of Ser. No. 07/380,374 filed Jul. 17, 1989 now abandoned.

FIELD OF THE INVENTION

The invention relates to panoramic rearview mirrors, and to the design requirements for the fabrication of grated optical surfaces.

BACKGROUND OF THE INVENTION

The common rearview mirror of an automotive vehicle is composed of a single piece of silvered glass or plexiglass approximately 5×25 centimeters in size. It is mounted near the center of the inner top section of the windshield as illustrated in FIG. 1. The plane of the mirror is oriented in a generally vertical position or is slightly tilted downward by a small pitch angle, and is rotated toward the driver. The angle of rotation or yaw angle, as measured from a vector normal to the mirror surface, is approximately 20 degrees with the vehicle axis of travel. The driver's eyes are approximately 60 centimeters from the mirror which yields a viewing angle of 10 to 20 degrees toward the rear of the vehicle.

To expand this viewing angle, a number of approaches have been tried. The simplest approach is for the driver to move his head from side to side to expand the total viewing angle. This yields only a limited increase in coverage and is a slow an tiring process. Outside rear view mirrors may be used to provide additional lateral coverage. This approach produces a variety of different unrelated views separated by blind spots.

A broader, continuous, viewing angle can only be obtained by increasing the size of the mirror. Wider inside mirrors can be used, but are limited to only a few additional centimeters in width and a correspondingly small increased in viewing angle. The confines of a vehicle limit the length of a planar mirror. A long, linear mirror would have to project forward through the windshield and back into the passenger compartment.

The mirror can be segmented into several independent mirror sections aligned along the top inner edge of the windshield to produce a wide angle view. This approach yields a wide field of vision, but requires a relatively large and bulky assembly, and produces confusing discontinuities as the view shifts from one mirror section to the other.

Convex mirrors expand the viewing angle and avoid the discontinuities, but produce substantial distortion of the reflected objects and misleading perception of their distances to the vehicle.

SUMMARY OF THE INVENTION

The principal and secondary objects of the invention are to provide a wide angle, distortion-free rearview for an automotive vehicle which can be mounted directly onto or near the surface of the windshield.

This is accomplished by forming a mirror that consists of a large number of extremely narrow elongated mirrors or micro grooves whose reflecting surfaces are all aligned in the same direction as a conventional rearview mirror and whose axes lies on the lines of the local intersection of the mirror and the windshield.

BRIEF DESCRIPTION OF THE DRAWING

FIG. 6 is a diagrammatical perspective view of a windshield equipped with the reflective device;

FIG. 7 is a partial, enlarged cross-sectional view taken along line 7—7 of FIG. 6;

FIG. 8 is a perspective view of a thin film; and

FIG. 9 is a partial, enlarged cross-sectional view of a second embodiment of the invention.

DESCRIPTION OF THE PREFERRED EMBODIMENT OF THE INVENTION

Figure 1:
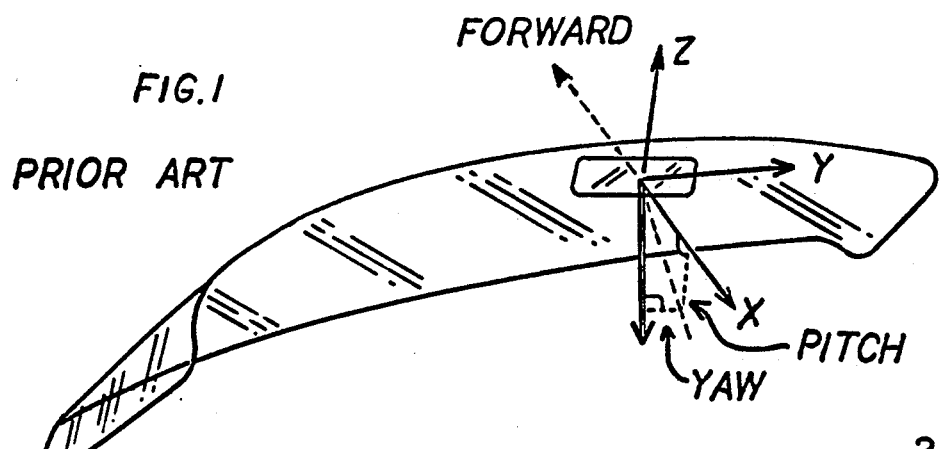
FIG. 1 is a diagrammatical perspective view of a windshield with a prior art rearview mirror attached. This figure also displays the reference coordinate system and typical mirror alignments.

Referring now to the drawing, the construction of the preferred embodiment of the invention will be explained.

Figure 2:
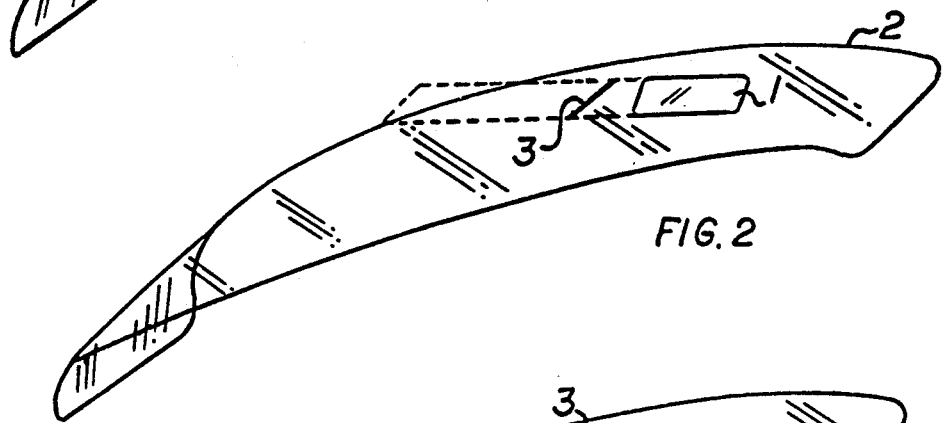
FIG. 2 is a diagrammatical perspective view of the line of intersection of the plane of a mirror and windshield.

To better explain the invention, let us consider that a conventional rearview mirror 1 of FIG. 2 has a planar surface and is oriented at an angle to the generally planar surface of the windshield 2, as previously explained in reference to FIG. 1 of the prior art. The mirror 1 is typically twisted toward the driver of a vehicle at a yaw angle of about 20 degrees in reference to the axis of travel. The mirror is also tilted downward at a pitch angle of about 10 degrees in order to provide the most desirable rearview scope to the operator of the vehicle.

It is possible to specifically define the intersection of the two planar surfaces of the mirror and the windshield. This line of intersection, and only this line of intersection, contains the locus of points where a linear segment of the mirror can be constructed which will reflect in the direction of the conventional mirror and lie on the surface of the windshield. This intersection is a line 3 that generally runs diagonally across the surface of the windshield from the upper right to the lower left.

Figure 3:
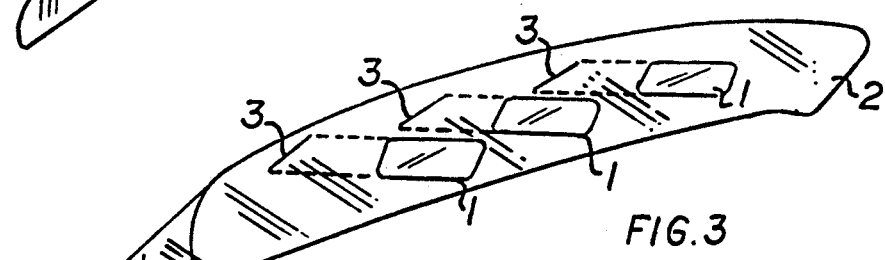
FIG. 3 is a diagrammatical perspective view of the successive lines of intersection of the plane of the mirror and windshield as the mirror is displaced across the windshield.
Figure 4:
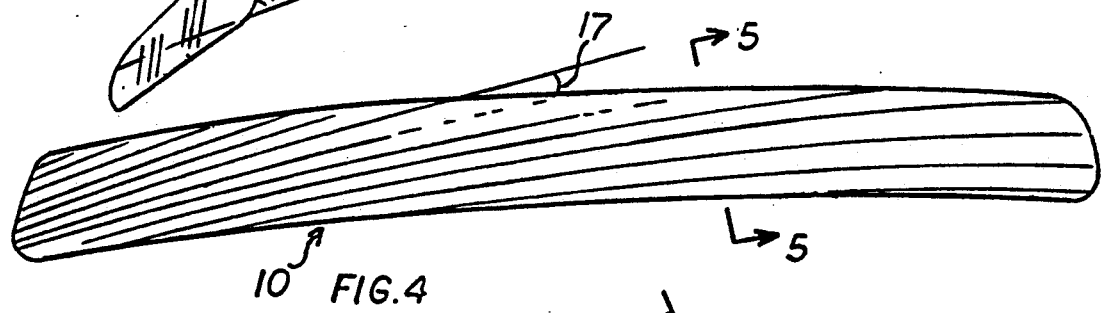
FIG. 4 is an illustration of the lines of intersection of the plane of the mirror and the windshield.
Figure 5:
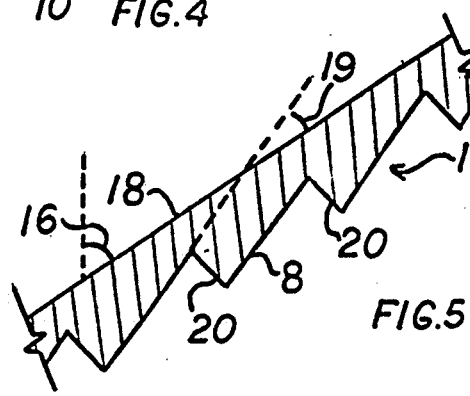
FIG. 5 is an illustration of the mirror angle taken along line 5—5 of FIG. 4.

As shown in FIG. 3, if the rearview mirror 1 is successively moved across the windshield 2 while its planar orientation is held constant, a series of diagonal lines of the intersection 3 are produced. If the windshield is a flat plane, the lines of intersection will be straight and parallel. For a conventional curved windshield, the lines of intersection will be slightly curved, and will form a relatively small angle (10 to 15 degrees) at the right end of the windshield and will gradually increase to larger angles (25 to 35 degrees) at the left end of the windshield as shown in FIGS. 4 and 5.

If the dimensions of the planar surface of a rearview mirror are reduced so that its width lies between 100 and 500 micrometers, and its length is oriented along the line of intersection of the mirror and the windshield, and a large number of these mirrors are combined and so oriented, as in a series of micro grooves, a total reflecting surface can be produced that lies parallel to the surface of the windshield and results in a panoramic rearview mirror.

This imaginary mirror would produce a continuous, essentially distortion-free view of the complete 180 sector behind the drive.

As shown in FIGS. 6 and 7, the afore-mentioned projection of composite segments of an imaginary, stretched rearview mirror over the upper portion of a vehicle windshield 2 is accomplished by means of a grated substrate 4. The substrate has a smooth outer face 5 with a shape congruent with the inward face 5a of the supporting structure 21 which is itself a congruent replica of the inner surface of the upper section 6 of the windshield 2. The supporting structure 21 extends horizontally almost over the entire span of the windshield 2 and is adjustably mounted in a position parallel to and spaced apart from the upper section 6 of the windshield by means of an articulated bracket 23. The inner face 7 of the substrate is grated to form a plurality of successive, generally parallel, narrow, elongated panels or lines 8 which are covered with a reflective lining 9. The windshield 2 may have a generally frustro-conical shape and be slanted downwardly and forwardly at a pitch angle of about −50 degrees. Since the pitch angle of a rearview mirror is approximately 5 to 10 degrees, the surface of each panel 8 in reference to the underlying inward surface of the supporting structure forms an angle which varies from about 45 to 50 degrees. Since the width of each panel is kept between 100 and 500 micrometers the thickness of the substrate can be within or close to that range of dimensions. Accordingly, the preferred embodiment of the invention is a thin film 10 illustrated in FIG. 8, made of flexible material which may be bonded to the inward face of support 21.

In a first alternate embodiment of the invention the thin film is integrally formed with the support inward face. This may be accomplished by etching the inward face 5a of the support 21 to form the narrow elongated mirror panels. Alternately the film 10 may be molded with enough thickness to maintain rigidity and be mounted without need of the supporting structure 21. In another alternate embodiment illustrated in FIG. 9, the thin film 10 is sandwiched between two plies 11 and 12 of a laminated support 13. A tinted transparent layer of material 14 such as liquid crystal can be layered between the thin film 10 and the innermost ply 12 of the support. The reflectivity of the device can then be adjusted by controlling the opacity of the transparent layer 14 by applying an adjustable voltage to it through a rheostat 15. In each embodiment, the grating of the inner face of the thin film or inward face of the device comprises a series of successive near-parallel panels or lines 8 which have a constant width of between 100 to 500 micrometers. The panels run in a generally diagonal direction across the span of the device, the exact direction being dependent upon the underlying geometry of the windshield, the windshield pitch angle, and the desired mirror angle.

The position of each panel can be determined by calculating the position of an intersecting line 3 between the actual windshield and a plane having the orientation of the virtual stretched mirror 1 illustrated in FIGS. 1–3. Due to the frustro-conical general shape of the windshield, the intersecting lines 3 corresponding to those various panels run diagonally and not exactly parallel. The degree of slant or yaw angle in reference to the horizon decreases as one moves away from the general area occupied by the operator of the vehicle assumed to be setting on the left side of the vehicle, as illustrated in FIGS. 4. The pitch angle of each panel 8 in reference to the back plane or forward face 18 of the thin film 10 is given by the difference between the pitch of the virtual mirror 1 and the pitch 16 of the underlying portion of the windshield. The grating parameters are thus fully defined by an intersecting transversal yaw angle 17 in reference to the horizon and a longitudinal mirror or pitch angle 19 for each panel 8. If the windshield and support has a more complex geometry such as a vertical curvature in addition to the customary horizontal curvature, then the variation of the windshield pitch across its width may have to be taken into account to avoid excessive distortion.

Table 1 lists the intersection angles and mirror angles for a succession of panels spanning the entire 120 centimeter span of a typical windshield. Typical panel data are provided at intervals of approximately 5.08 centimeters. In this model the general radius of the windshield was 4.5 meters with a pitch angle of −50 degrees. The virtual mirror was assumed to have a pitch angle of −10 degrees and a yaw angle of −20 degrees. The median point of each panel is given in reference to the center of the windshield. The distance to the chord joining the two ends of the windshield is also given.

TABLE 1

| WINDSHIELD REFLECTING SECTION PANEL LOCATION (CENTIMETERS) | | | | INTERCEPTING MIRROR | |
|---|---|---|---|---|---|
| To/From Center | To Chord | Yaw Angle | LEFT | ANGLE | ANGLE |
| −60.96 | 4.907 | 9.21 | | 30.50 | 48.04 |
| −55.88 | 4.119 | 8.43 | | 29.84 | 47.65 |
| −50.90 | 3.40 | 7.66 | | 29.17 | 47.27 |
| −45.72 | 2.753 | 6.89 | | 28.50 | 46.91 |
| −40.64 | 2.174 | 6.12 | | 27.82 | 46.54 |
| −35.56 | 1.664 | 5.36 | | 27.14 | 46.19 |
| −30.48 | 1.222 | 4.59 | | 26.45 | 45.85 |
| −25.40 | .85 | 3.82 | | 25.75 | 45.51 |
| −20.32 | .541 | 3.06 | | 25.05 | 45.18 |
| −15.24 | .304 | 2.29 | | 24.34 | 44.86 |
| −10.16 | .134 | 1.53 | | 23.63 | 44.55 |
| −5.08 | .033 | 0.76 | | 22.91 | 44.25 |
| 0.00 | 0.00 | 0.00 | - CENTER - | 22.18 | 43.96 |
| 5.08 | .033 | −0.76 | | 21.44 | 43.67 |
| 10.16 | .134 | −1.53 | | 20.69 | 43.40 |
| 15.24 | .304 | −2.29 | | 19.94 | 43.13 |
| 20.32 | .541 | −3.06 | | 19.18 | 42.88 |
| 25.40 | .85 | −3.82 | | 18.41 | 42.63 |
| 30.48 | 1.222 | −4.59 | | 17.63 | 42.40 |
| 35.58 | 1.664 | −5.36 | | 16.64 | 42.17 |
| 40.64 | 2.174 | −6.12 | | 16.04 | 41.95 |
| 45.72 | 2.755 | −6.89 | | 15.23 | 41.75 |
| 50.80 | 3.40 | −7.66 | | 14.41 | 41.55 |
| 55.88 | 4.119 | −8.43 | | 13.58 | 41.37 |
| 60.96 | 4.907 | −9.21 | - RIGHT - | 12.74 | 41.19 |

The reflective coating 9 may be applied to the entire grated surface. In an alternate embodiment where the supporting structure is made of transparent material, the small ledges 20 which are formed between each panel may be left uncovered to allow light to come at a high incident angle through the windshield and through this unobstructed areas of the supporting structure.

While the preferred embodiment of the invention has been described in connection with the fabrication of an automotive vehicle windshield, other embodiments may be devised in connection with the same or other applications without departing from the spirit of the invention and the scope of the appended claims.

What is claimed is:

1. In combination with a vehicle windshield having generally parallel front and back faces, a horizontal radius of curvature, and a vertical slant, a reflective device designed to provide wide scope rearview to an operator of the vehicle, said device comprising:

an elongated support adjustably mounted in a position substantially parallel to and spaced apart from a transversal upper section of the windshield back face, said section substantially spanning the full width of the windshield, said support having a outward face facing said section and an opposite inward face, said inward face being a congruent replica of said section;

a grated substrate having an outer face in contact and congruent with said inward face, and an inner face defining a succession of narrow, elongated reflective panels wherein said panels are oriented to present a composite but linearly reflective surface to light rays emanating from a point in space located inwardly from said windshield, the inner face of each of said panels being flat, reflective and forming varying angles with the outer face of the substrate.

2. The combination claimed in claim 1, wherein each of said panels lies in a plane defined by a first transversal angle with the horizon and by a second longitudinal angle with said inward face, the first and second angles of the successive panels varying from panel to panel across the span of said support to accommodate the slant and radius of said inward face.

3. The combination of claim 2, wherein said grated substrate is integral with said inward face.

4. The combination of claim 3, wherein said panels are etched into said inward face.

5. The combination of claim 2, wherein the width of each of said panels falls between 100 and 500 micrometers.

6. The combination of claim 2, wherein said windshield has a generally arcuate shape slanting downwardly and forwardly.

7. The combination of claim 2, which further comprises a layer of tinted material over said grated surface.

8. The combination of claim 7, wherein said layer comprises means for adjusting the tint of the material.

* * * * *